Dec. 28, 1954    L. D. McGRAW ET AL    2,698,258
METHOD OF COATING REFLECTIVE METAL SURFACE
Filed May 25, 1950

INVENTORS.
Leslie D. McGraw
Charles L. Faust
BY
AGENTS.

2,698,258
Patented Dec. 28, 1954

2,698,258

METHOD OF COATING REFLECTIVE METAL SURFACE

Leslie D. McGraw and Charles L. Faust, Columbus, Ohio, assignors, by mesne assignments, to Ohio Plate Glass Company, Toledo, Ohio, a corporation of Ohio Application May 25, 1950, Serial No. 164,056

5 Claims. (Cl. 117—35)

This invention relates to protective coatings for mirrors. More particularly, this invention relates to a method or process for providing compositions useful in producing protective coatings, to such compositions per se, to a method or process for protectively coating mirrors and to the protective coated mirror per se.

It is well known to those skilled in the art of producing silver mirrors that the thin reflecting silver film itself possesses very poor resistance to deterioration or oxidation from exposure to atmospheric gases under the conditions of its normal domestic and industrial use. Moreover, during manufacturing and assembling operations, the mirror is subjected to extensive handling and certain cutting and edge-polishing operations which can cause scratches to appear in the silver, as well as peeling, flaking, or other loosening of the silver from the glass base or protective coating from the silver film. The object, thus, of protective coatings applied to the thin silver film is to protect it against these hazards with retention of the initially good reflecting quality and color of the mirror. However, protective coatings heretofore available have not only lacked one or more desirable properties necessary to fully protect the silver film as discussed above but, additionally, have sometimes required complicated and expensive operations for preparation and application of such coatings to mirrors. To lower the cost of manufacturing and assembling mirrors as well as to improve their life, would be a highly advantageous improvement in the mirror art, and, therefore, an important object of the present invention is to afford a simple, economical method or process of protectively coating mirrors and a protective coating material which avoids the objections alluded to heretofore.

It is another object of this invention to provide a mirror having a coating characterized by its ability to protect the reflecting surface against deterioration, moisture penetration, and oxidation over long periods of time and against flaking, peeling, and scratching during manufacturing and assembling operations.

It is still another object of this invention to provide a method or process of coating a mirror with a layer which protects the reflecting surface from deterioration and oxidation.

It is a further object of this invention to provide a composition of matter useful in producing a protective coating for mirrors.

It is a still further object of this invention to provide a method for producing a composition useful in protectively coating a mirror.

These and other objects and advantages of the present invention will become more apparent from the following detailed description, example, and drawing, in which.

It has now been found that, by aging and then diluting an alkaline solution of a soluble metallic salt with a large volume of water, a precipitate will form at low temperatures preferentially on the reflecting surface of a mirror and on baking can be converted into an adherent, hard, air- and moisture-resistant metallic oxide film. The mirror protected in this manner resists deterioration longer than a mirror without such protection and, further, the protective coating is so adherent to the reflecting film that it will withstand cutting and handling without flaking, peeling or separation from the glass surface.

Figure 1:
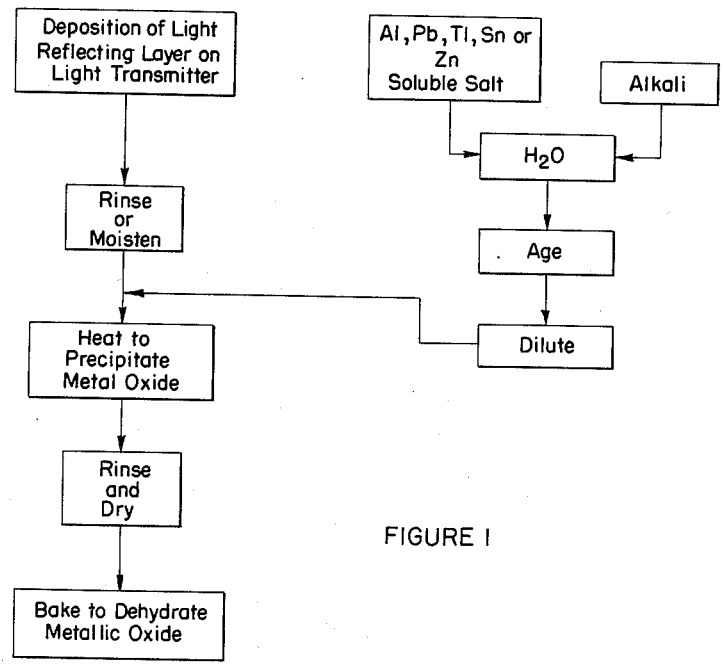
Fig. 1 is a flow sheet of the methods described and claimed herein.
Figure 2:
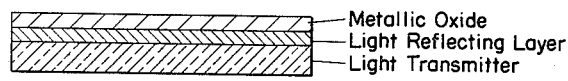
Fig. 2 is a vertical cross-sectional view of a mirror containing the novel coating of this invention.

Generally, with reference to Figures 1 and 2 of the drawing, a minor amount of a soluble metallic salt is mixed with a major amount of an alkali. These materials are then dissolved in a large volume of water and the resulting solution allowed to age for about two weeks. At the end of this time the solution is greatly diluted with water, and a portion thereof used to coat the reflecting film. The mirror and solution thereon is then warmed and a precipitate begins to slowly form on the reflecting film or layer, the temperature at which it first appears depending on dilution and rate of heating. As soon as a flocculent precipitate appears in the solution, or after some predetermined time interval, the solution is dumped from the mirror which is thereupon rinsed, dried and baked. Films produced by the method disclosed herein are from about 0.005 mil upwards in thickness and have a tan color. Even thicker films can, of course, by applied by repeated precipitation from new solutions, drying and baking.

The mirror to be protected by the method disclosed herein may be made by any process. It is preferred to make the mirror by the Rochelle salt, or the chemical reduction method due to the fact that it produces a thin, rather perfect film of silver which is highly reflective and adherent to the glass. However, metal reflecting or semi-reflecting films can be applied by vacuum deposition, sputtering, sublimation, casting, induction, melting and puddling, dipping, and spraying. Moreover, the light reflective layer need not be of thin silver but can be of any metal, for example, copper, gold, and platinum in thin layers which have the property of reflecting light and which, under normal conditions of exposure and manufacturing, would be subject to oxidation, deterioration, peeling, blistering, or other harm. Likewise, the light permeable or transmitting layer need not be glass but can be quartz, Lucite, cellophane, or any semi- or selectively transparent or fully transparent material which will not be adversely affected by a temperature of up to 120° C. While the light reflecting material has been described as a mirror, reflectors and other light reflecting means, semi- or selectively reflecting, can be protected according to the teaching of this invention.

The soluble metallic salts of this invention are aluminum, lead (valence 2) thallium (valence 1), tin (either valance 2 or 4) or zinc acetate, chlorate, chloride, glycolate, nitrate, oxide, perchlorate, phosphate, sulfate and tartrate salts soluble in alkaline solutions. It, however, is preferred to use zinc oxide or chloride as the soluble salt, and while the present invention will be particularly described with reference to zinc oxide, it is not intended to be limited thereby.

Sodium hydroxide is the alkali material mixed with the salt. Cesium, lithium, potassium, or rubidium hydroxides can be used in place of the sodium hydroxide. Moreover, for the purposes of this invention ammonium hydroxide will be considered an alkali or an equivalent of the other alkali hydroxides and can be used therein.

The ratio of the soluble metallic salt to the alkali is from about 8 to about 17% by weight of the salt to from about 83 to about 92% by weight of the alkali based on the dry weights of the compounds. It has been found best to use about 12% by weight of salt with the balance being the alkali.

The mixture of alkali and soluble metallic salt is then added to a large volume of water. They can be added in the ratio of about 225 grams of the mixture in from about 0.5 to about 1.5 kilograms of water, although about 1 kilogram is preferable.

In general the greater the alkali to salt ratio the greater must be the final dilution of the solution to result in hydrolysis in the optimum temperature range for good adherence. It is to be understood that the stable metallic solution containing an excess of hydroxide of this invention can be so diluted as to form the protective film under discussion when heated to the optimum temperature range. If the alkali to salt ratio differs from that disclosed above, careful preparation of solution and subsequent aging and dilution will not provide a solution which on heating will deposit an adherent continuous film on the reflecting layer that on final drying and baking will give the properties desired herein. In such cases it has also been observed that a precipitate may not form or may only form at temperatures which endanger the reflective film.

After preparation, the water solution of soluble metallic salt and alkali must be allowed to age for from 1 to 3 weeks. About two weeks' aging is satisfactory for most purposes. Unless the solution is aged, an adherent precipitate will not form on the mirror although precipitation in the solution will still occur. While it is desirable to age the solution in tightly stoppered bottles, it may be performed in beakers or containers covered to prevent foreign particles like dirt and dust from collecting in the solution. It is not precisely understood why the aging step is critical; however, if it is omitted a precipitate will not form in the desired temperature range on the silvered back or if a precipitate does form, it will form in the solution and not result in adherent protective coating on the metal. For example, where zinc chloride or oxide is used with sodium hydroxide, it may be that some complex zinc or sodium salt of silicic acid forms or hydrolysis occurs during the aging step that is conducive to the formation of the zinc oxide-zinc hydroxide $(Zn(OH)_2+ZnO)$ coating in the right chemical and physical condition on dilution and heating.

After aging, the solution is diluted with water to from 5 to 20 times its original volume. Excellent results have been obtained with dilutions of eight times its original volume. It is necessary to dilute the mixture by at least 5 times its original volume in order to keep the temperature of precipitation relatively low since the hydrolysis temperature depends on dilution; otherwise, it would be necessary to resort to high temperatures which would damage the reflective film on the mirror since such films are particularly sensitive to high temperatures in the presence of strong caustic. Also, at high temperatures the protective film tends to redissolve. If the original solution is diluted in excess of 20 times its original volume, the protective coating will be too thin and powdery and will contain pin holes, thus destroying its usefulness and, hence, this represents an upper limit.

It will be appreciated that dilution of the solution should be made at about the time a precipitate is to be formed on the silver film of the mirror and that the solution must not be diluted appreciably more than described above, for if the solution is too dilute a nonadherent precipitate will also form in the solution at room temperature before it can be heated to the operating range. Thus, if dilution is performed as described supra before the heating-precipitation step is undertaken the solution is not too dilute and the precipitate will not form at room temperatures but only in the preferred range.

After the solution has been diluted, a portion is immediately used to cover the reflective film of the mirror either dry or preferably still wet with rinse water from the silvering step, placed on a table as in common silvering practice. If the Rochelle process is not used, the mirror should be rinsed with water or wetted preparatory to covering it with the aged and diluted solution.

The solution and/or mirror is then rapidly heated to a relatively low temperature to cause the precipitate to form on the silver film. The solution must not be heated too slowly or the precipitate will form prematurely at a low temperature and not adhere to the reflective film on baking and, moreover, a high temperature is to be avoided since it may also cause the precipitate to redissolve. While not absolutely necessary, the solution can be agitated, for example, with a stream of air or carbon dioxide. Care must be exercised when employing $CO_2$ since it will neutralize the alkali present, and while advantage can be taken of the fact that the precipitate will form at lower temperatures as a result of some neutralization, the precipitate may not adhere to the metal reflecting layer. Alternatively, if desirable, mechanical agitation or shaking can be employed while a concentrated solution of sodium bicarbonate (25 g. per 100 cc.) is added thereto. In any case, whether or not carbon dioxide is added, the pH of the resulting solution should remain on the basic side. The solution and/or mirror can be heated in a number of ways, although it is preferred to either heat it with infra-red ray lamps or to play steam or hot water on the underside of the mirror or on sides of the container. As the temperature is increased preferably from about 55° to about 60° C., although temperatures up to 70° C. can be used, an adherent tan to white deposit forms on the silver film sometimes accompanied by formation of a fine white precipitate in the solution. As soon as a flocculent precipitate appears in the solution (in about 5 minutes) in this temperature range or at a predetermined earlier time the mirror containing the precipitate should be removed from the solution. In general, the overall time of precipitation will take from 3 to 8 minutes. Instead of covering the mirror with a solution, the mirror can be placed in a tank with the solution.

After the precipitate has formed on the silver film surface, the mirror is removed from the bath, rinsed to remove excess solution containing alkali, dried for from 15 to 60 minutes in air and baked at about 120° C. to remove any water of hydration and convert the metallic hydroxide to metallic oxide and possibly also to cause some chemical or physical union of the metallic oxide to the silver backing since the metallic oxide film after baking is very tenaciously attached to the silver film. The adherence of the metal reflecting surface to the glass is also improved by the baking. While baking can be done in inert or other noninjurious atmospheres to avoid any possibility of atmospheric contamination, it is not essential. The baking temperature, however, should not exceed about 130° C. to avoid uneven expansion between the protective coating, reflective film, and glass which may cause blistering or peeling. Furthermore, prolonged heating above 130° C. will recrystallize the silver and render it translucent.

Subsequent regeneration of the metallic oxide film coating solution does not appear practical after it has once been used since it is too dilute. The cost of materials lost by discarding the dilute solution after each use is negligible.

While not absolutely essential, it is highly desirable that the chemical components used in the practice of the present invention be as pure as possible in order to obtain consistent results.

The following example will serve to illustrate the invention with more particularity to those skilled in the art:

3.45 ounces of zinc oxide and 26.55 ounces of sodium hydroxide, dry weight, were dissolved in one gallon of water. After aging for two weeks while protected from the atmosphere, the solution was diluted to eight times its original volume. A portion of the solution was then poured onto the wet silver surface of a mirror which had been silvered by means of the Rochelle salt process. The solution was heated by means of infra-red lamps to a temperature of from 55 to 60° C. The solution became cloudy and a fine, white adherent precipitate formed on the mirror back. The coating appeared tan when viewed by transmitted light from the underlying silver. When a flocculate precipitate appeared in the solution in this temperature range after about five minutes, the mirror containing the fine tan coating thereon was removed from the solution. The coating was rinsed, dried in air, and baked in an over at 120° C. under an air atmosphere for about 30 minutes. The final zinc oxide coating was about 0.005 mil thick. X-ray analysis of the unbaked coating disclosed that it was a mixture of zinc hydroxide and zinc oxide while the baked coating showed the presence of only zinc oxide.

A similar silvered mirror, but without the zinc coating, was tested in a moisture cabinet with the coated mirror as described herein as well as with a conventional shellac-backed mirror under accelerated conditions and the results are shown below:

*Test I*

With the zinc oxide film to protect it, no other coatings used, the silvered mirror maintained its initial brilliance and adherence for three days at 112° F., 100% relative humidity.

*Test II*

With no protective coating, the silvered mirror lost its brilliance and adherence in one day at 112° F., 100% relative humidity.

*Test III*

A shellac backing applied to the coating without any intermediate coating offered protection for less than one day exposed to 100% relative humidity at 112° F.

Unlike the silver film on the unprotected mirror or the shellac protected mirror, the silver film, protected with the composition of this invention, did not flake or peel on cutting or edge-polishing.

It is, thus, seen from the above tests that the protective coating of the zinc oxide noticeably increases the life of the silver film on the glass surface as well as preventing flaking, etc. It is not precisely known why the zinc film proves to be so protective since it is apparently only zinc oxide. However, it is possible that the zinc oxide forms a complex compound, oxide, or salt with the silver such as $Ag_xZn_yO_z$ where X, Y, and Z are whole numbers, since on scratching the silver surface or layers, the mirror adjacent thereto does not discolor. This would possibly indicate that the zinc oxide combines with the water or other material in the atmosphere to protect the silver, or it combines with some of the silver in such a manner that the zinc is adjacent to the silver and the oxide radical is exposed to the atmosphere. In any event, whatever the precise nature of the combination that results from the process of this invention, it is apparent that a good protective coating has been obtained.

The protective benefits given by the zinc oxide are substantially increased when it is used in combination with a subsequent organic coating or coatings. Furthermore, the protective action of any organic coating is improved to a significant degree by applying it over the inorganic primer, i. e., chemically precipitated and baked zinc oxide. In particular, the protective value of the organic base mirror backing of the copending application, Serial No. 164,058, now U. S. Letters Patent No. 2,595,867, is greatly improved. For example: When that organic base material is used alone, the mirror resists deterioration for three days or more of exposure in the accelerated test of 125° F.—100 per cent relative humidity; when the zinc oxide, inorganic primer coating described herein is applied to the mirror and over it is applied said organic base material, the mirror with the duplex, protective backing then resists deterioration for 16 days or more in the same accelerated test.

The zinc oxide film is also very tenaciously attached to the silver and in no manner damages the excellent adherence of the silver or other metal film to the glass. For example, if, to a poorly silvered mirror, an adhesive tape is attached and pulled, the tape will remove the silver film from the glass. A properly prepared mirror has such a good metal-to-glass bond that adhesive tape cannot detach the metal film. If the same test is applied to properly prepared mirrors that have received the chemically precipitated, baked zinc oxide film of this invention, it will be found that the adhesive is thoroughly attached to the zinc oxide film, and only the tape less its adhesive coating is removed and this without damage to the mirror. This example is presented as evidence of the fact that the zinc oxide film in no way damages a well- and properly-prepared mirror. The robbing of the adhesive by the zinc oxide film shows an important property that it has for improving mirrors in that it is an excellent base on which to apply subsequent organic coatings. Hence, an improved mirror can be prepared by using the metallic oxide (for example zinc oxide) film with any of the commercially known organic mirror backing materials.

In summary, it is seen that a new and novel coating composition and method for preparing the composition has been evolved, as well as a new and novel mirror containing a coating composition which will withstand deterioration as well as flaking and peeling normally resulting from cutting mirrors and the method for producing such a mirror. The new and novel results disclosed herein are due to the fact that it has been found that aluminum, lead, thallium, tin or zinc oxide compositions baked after being precipitated from warmed, aged, and diluted alkaline solutions of soluble salts of such metals, provide excellent protective coatings for mirrors and other reflective materials.

This application is copending with and related to the McGraw, Faust and Mueller applications Serial No. 164,057, filed May 25, 1950, and Serial No. 164,058, filed May 25, 1950, now U. S. Letters Patent No. 2,595,800 and No. 2,595,867, respectively.

It will be understood that, while this invention has been described with particular reference to the protection of silvered mirrors, it is to be understood that in its broad concept and scope it is applicable to the protection of all metallic kinds of light-reflecting materials suitable for mirrors or light transmitting substances and subject to deterioration, oxidation and wear, etc., and, thus, with respect to the scope of the invention, the foregoing material is to be considered as illustrative rather than limiting.

What is claimed is:

1. The method of providing articles having at least one reflective metal surface with a protective coating on said surface, comprising dissolving in water from about 83% to about 92% of a material selected from the group consisting of alkali metal hydroxide and ammonium hydroxide, from about 8% to about 17% of a metallic compound capable of forming a coherent, adherent coating of chemically deposited oxide and selected from the group consisting of the oxides and salts of aluminum, lead, thallium, tin, and zinc, soluble in an aqueous solution of said hydroxide, said metallic compound, said hydroxide, and said water being present in the proportions of about 225 g. of metallic compound and hydroxide mixture, and from about 0.5 to about 1.5 kg. of water, aging the resulting solution for from 1 to 3 weeks, diluting the aged solution to from 5 to 20 times its original volume, covering the reflective metal surface of an article with the diluted solution, heating the diluted solution covering such surface to a temperature not in excess of 70° C. to induce said coherent, adherent deposition thereupon, removing the article from the solution, rinsing, drying, and finally baking said article containing said coating.

2. The method of providing articles having at least one reflective metal surface with protective coatings according to claim 1, wherein the diluted solution is provided with sufficient sodium bicarbonate to maintain said solution basic when dissolved in water during the heating step.

3. The method of providing articles having at least one reflective metal surface with protective coatings according to claim 1, wherein the metallic compound is zinc oxide.

4. The method of providing articles having at least one reflective metal surface with protective coatings according to claim 1, wherein the metallic compound is zinc chloride.

5. The method set forth in claim 1, wherein said diluted solution is rapidly warmed to a temperature of from 55° C. to 70° C., and where the article is finally baked at about 120° C.

References Cited in the file of this patent

UNITED STATES PATENTS

| Number | Name | Date |
|---|---|---|
| 647,989 | Ryan et al. | Apr. 24, 1900 |
| 991,273 | Christensen | May 2, 1911 |
| 1,023,964 | Ranson | Apr. 23, 1912 |
| 1,791,704 | Bennett | Feb. 10, 1931 |
| 1,931,374 | Clark et al. | Oct. 17, 1933 |
| 2,019,852 | Harrap | Nov. 5, 1935 |
| 2,165,187 | Wilson et al. | July 4, 1939 |
| 2,294,940 | Skolnik | Sept. 8, 1942 |
| 2,357,269 | Russell | Aug. 29, 1944 |
| 2,372,639 | Reynolds | Mar. 27, 1945 |
| 2,394,930 | McRae | Feb. 12, 1946 |
| 2,410,733 | Hewlett | Nov. 5, 1946 |
| 2,468,568 | McCuster | Apr. 26, 1949 |
| 2,530,458 | Frisch | Nov. 21, 1950 |
| 2,544,139 | Deyrup | Mar. 6, 1951 |

FOREIGN PATENTS

| Number | Country | Date |
|---|---|---|
| 19,597 | Great Britain | of 1900 |
| 196,843 | Great Britain | of 1923 |
| 15,131 | Australia | of 1928 |

OTHER REFERENCES

Armor, "Contributions from the Chemical Laboratory of the University of Michigan," by A. B. Prescott, published in the Chemical News and Journal of Physical Science, vol. XLII (42), pages 29–31, by J. Davey, London, England, (1880).